United States Patent [19]
Mitsumoto et al.

[11] Patent Number: 5,848,092
[45] Date of Patent: Dec. 8, 1998

[54] LASER-DIODE-PUMPED SOLID STATE LASER AND METHOD OF MANUFACTURING THE SAME

[75] Inventors: Shinji Mitsumoto; Yoji Okazaki, both of Kanagawa-ken, Japan

[73] Assignee: Fuji Photo Film Co., Ltd., Kanagawa-Ken, Japan

[21] Appl. No.: 580,512

[22] Filed: Dec. 28, 1995

[30] Foreign Application Priority Data

Dec. 28, 1994 [JP] Japan .................................. 6-327790

[51] Int. Cl.⁶ ............................................. H01S 3/08
[52] U.S. Cl. ........................... 372/107; 372/34; 372/92; 372/98
[58] Field of Search ............................... 372/34, 36, 75, 372/92, 107, 69, 70, 22, 108, 98, 99, 61

[56] References Cited

U.S. PATENT DOCUMENTS

| | | | |
|---|---|---|---|
| 3,996,527 | 12/1976 | Hernqvist | 372/99 |
| 4,365,335 | 12/1982 | Lamboo | 372/34 |
| 4,653,056 | 3/1987 | Baer et al. | 372/34 |
| 4,730,335 | 3/1988 | Clark et al. | 372/75 |
| 4,731,795 | 3/1988 | Clark et al. | 372/107 |
| 4,777,639 | 10/1988 | Whitehouse | 372/99 |
| 4,805,185 | 2/1989 | Smith | 372/99 |
| 4,847,851 | 7/1989 | Dixon | 372/99 |
| 4,872,177 | 10/1989 | Baer et al. | 372/75 |
| 5,062,117 | 10/1991 | Anthon et al. | 372/75 |
| 5,130,996 | 7/1992 | Amano et al. | 372/75 |
| 5,181,214 | 1/1993 | Berger et al. | 372/36 |
| 5,187,714 | 2/1993 | Okazaki et al. | 372/36 |
| 5,267,252 | 11/1993 | Amano | 372/36 |
| 5,341,388 | 8/1994 | Masuda et al. | 372/36 |
| 5,381,430 | 1/1995 | Nozaki et al. | 372/22 |
| 5,446,750 | 8/1995 | Ohtsuka et al. | 372/36 |

*Primary Examiner*—Leon Scott, Jr.
*Attorney, Agent, or Firm*—Sughrue, Mion, Zinn, Macpeak & Seas, PLLC

[57] ABSTRACT

A laser-diode-pumped solid state laser includes a Fabry-Perot resonator having a pair of resonator mirrors. A holder is provided with a pair of mirror mounting portions respectively having mirror mounting surfaces which are spaced from each other in the direction of the optical axis of the resonator and extend to intersect the optical axis of the resonator, and with connecting portion which is formed integrally with the mirror mounting portions to connect the mirror mounting portions. The resonator mirrors are fixed to the mirror mounting portions with their light transmissive end faces bonded to the mirror mounting surfaces of the holder.

5 Claims, 3 Drawing Sheets

LASER-DIODE-PUMPED SOLID STATE LASER AND METHOD OF MANUFACTURING THE SAME

BACKGROUND OF THE INVENTION

1. Field of the Invention

This invention relates to a laser-diode-pumped solid state laser in which a solid state laser crystal is pumped by a laser diode (semiconductor laser), and more particularly to such a laser-diode-pumped solid state laser having an improved resonator mirror mounting structure. This invention further relates to a method of manufacturing a laser-diode-pumped solid state laser having the improved resonator mirror mounting structure.

2. Description of the Related Art

There has been known a laser-diode-pumped solid state laser in which a solid state laser crystal doped with a rare earth element such as neodymium is pumped by a light beam produced by a laser diode. In such a laser, a Fabry-Perot resonator comprising a pair of resonator mirrors is generally employed as a resonator.

Conventionally, the two mirrors are fixed to separate holders and are positioned relative to each other by bonding the holders to a base plate or bonding together in alignment with each other in the direction of the optical axis.

Further as disclosed in U.S. Pat. No. 4,731,795, there has been known a structure in which the resonator mirrors and other components are inserted into a cylindrical holder and fixed thereto.

In the Fabry-Perot resonator, in order to keep stable the laser oscillation, it is necessary to prevent the resonator length (the distance between the surfaces of the resonator mirrors) from largely changing with the ambient temperature, for instance, by controlling the temperature of the resonator. More particularly, the change in the resonator length should be not larger than ¼ of the oscillation wavelength and more preferably should be not larger than $\frac{1}{10}$ of the same. Since the oscillation wavelength of laser-diode-pumped solid state laser is typically 1 $\mu$m or so, the change in the resonator length should be not larger than 0.1 $\mu$m.

In the conventional laser-diode-pumped solid state laser structure where the resonator mirrors are bonded to separate holders, it is difficult to suppress the change in the resonator length within the above identified range due to a large number of bonded parts, e.g., those between the holders, between the holders and the base plate, and the like.

That is, adhesive of polymer or the like is not perfectly cured but shrinkage on curing sometimes progresses by aging or during storage at an elevated temperature. Further the thickness of the adhesive layer can change due to stress caused by difference in linear expansion coefficient between the resonator mirror and the holder during storage at low or high temperature. Even if the laser is operated at a controlled temperature, change in thickness of the adhesive layer due to change in the degree of cure or due to stress can occur when power supply to the laser is cut for interruption of operation or transfer of the laser. When the number of bonded parts is large, the change in the thickness of the adhesive layers accumulates and results in change in resonator length with time.

For example, just bonding light transmissive end faces of a pair of resonator mirrors to a pair of holders and bonding together the holders in alignment with each other in the direction of the optical axis produces three bonded parts in the longitudinal direction of the resonator. Further if other optical components such as an etalon are fixed in the resonator in the similar manner, the number of bonded parts increases up to 4 to 9, which results in an acceptable change in length of 0.01 $\mu$m or so for each bonded part. This is very difficult to realize even if the temperature of the resonator is controlled.

On the other hand, the structure disclosed in U.S. Pat. No. 4,731,795 is disadvantageous in that since the resonator mirrors and other laser components are not bonded to a holder by way of members which are perpendicular to the optical axis, the components can be moved after a long use or when subjected to vibration though it is free from the problem caused by a large number of bonded parts.

SUMMARY OF THE INVENTION

In view of the foregoing observations and description, the primary object of the present invention is to provide a laser-diode-pumped solid state laser in which the resonator mirrors are firmly fixed and there is no fear that the length of the resonator largely changes with the ambient temperature.

In accordance with the present invention, there is provided a laser-diode-pumped solid state laser comprising a Fabry-Perot resonator having a pair of resonator mirrors wherein the improvement comprises a holder provided with a pair of mirror mounting portions respectively having mirror mounting surfaces which are spaced from each other in the direction of the optical axis of the resonator and extend to intersect the optical axis of the resonator, and with connecting portion which is formed integrally with the mirror mounting portions to connect the mirror mounting portions, the resonator mirrors being fixed to the mirror mounting portions with their light transmissive end faces bonded to the mirror mounting surfaces of the holder.

Preferably the mirror mounting surfaces are mirror-finished.

Preferably the holder is provided with at least one part mounting portion, for mounting a laser component other than the resonator mirror, which is integrally formed with the connecting portion spaced from the mirror mounting portions in the direction of the optical axis of the resonator and is provided with a part mounting surface extending to intersect the optical axis of the resonator. Especially it is preferred that a component to be disposed in the resonator be fixed to the part mounting portion. In this case, the component is disposed between the mirror mounting portions.

In the solid state laser of the present invention, since the mirror mounting portions are integrated with each other by way of the connecting portion, there are only two bonded parts which can affect the length of the resonator. Even if other optical components such as an etalon are disposed, the number of bonded parts which can affect the length of the resonator is still two when the optical component is fixed to the part mounting portion formed on the holder irrespective of how to fix the component to the mounting portion or even if the component is bonded to the mounting portion.

Accordingly change in the length of the resonator mainly depends upon the sum of the changes in the thickness of two adhesive layers between the resonator mirrors and the mirror mounting surfaces due to change in the degree of cure or due to stress, whereby change in the length of the resonator can be suppressed to relatively small.

When the mirror mounting surfaces are mirror-finished, the adhesive spreads wide uniformly and the adhesive layer can be smaller in thickness, whereby change in the resonator length can be smaller.

Further since the resonator mirrors are bonded to the holder, the resonator mirrors cannot be moved from the predetermined position after a long use or when subjected to vibration.

DESCRIPTION OF THE PREFERRED EMBODIMENT

Figure 1:
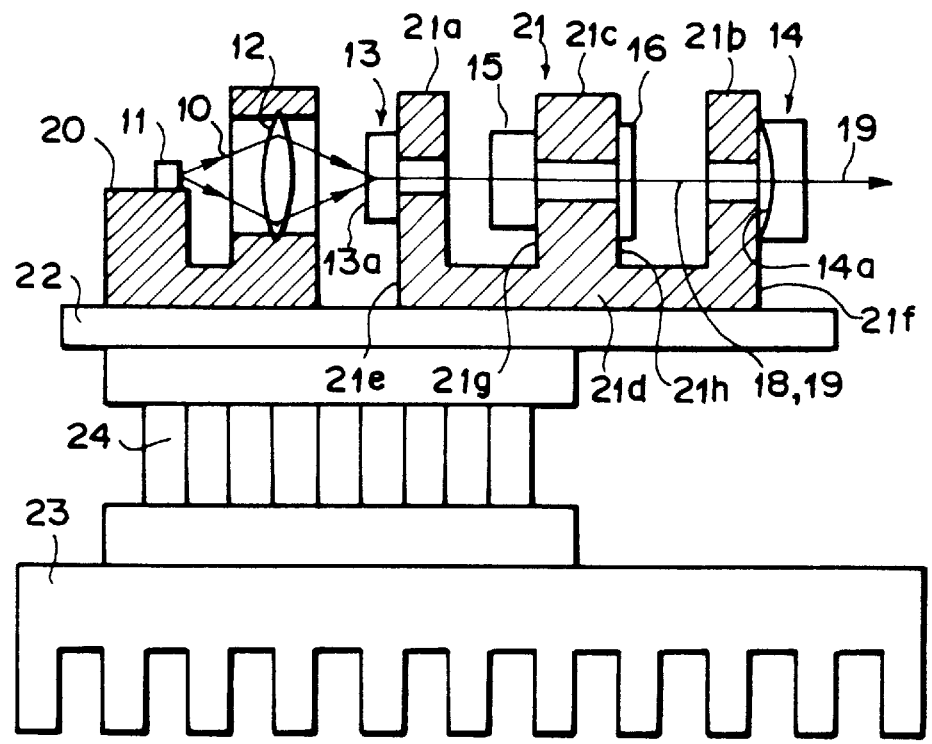
FIG. 1 is a schematic side view showing a laser-diode-pumped solid state laser in accordance with a first embodiment of the present invention.

In FIG. 1, a laser-diode-pumped solid state laser in accordance with a first embodiment of the present invention comprises a semiconductor laser 11 (in the form of a chip) which produces a laser beam 10 as a pumping beam, a condenser lens 12 which condenses the laser beam 10, which is produced as divergent light, a YAG crystal 13 which is a solid laser medium doped with neodymium (Nd) (will be referred to as "Nd:YAG crystal 13", hereinbelow), and a resonator mirror 14 disposed forward (the right side as seen in FIG. 1) of the Nd:YAG crystal 13.

A $KNbO_3$ crystal 15, which is a nonlinear optical material, and an etalon 16 in the form of a quartz plate are disposed between the resonator mirror 14 and the Nd:YAG crystal 13 in this order from the Nd:YAG crystal side.

The semiconductor laser 11 produces a laser beam 10 having a wavelength of 809 nm. Neodymium ions in the Nd:YAG crystal 13 are stimulated by the laser beam 10 and the Nd:YAG crystal 13 thereby produces a laser beam having a wavelength of 946 nm. The pumping light incident side end face 13a of the Nd:YAG crystal 13 is provided with a coating which is highly reflecting (a reflectivity of not lower than 99.9%) at 946 nm and antireflecting (a transmittance of not lower than 99%) at 809 nm (the wavelength of pumping leaser beam 10). The mirror surface 14a of the resonator mirror 14 is provided with a coating which is highly reflecting at 946 nm and antireflecting at 473 nm (the wavelength of second harmonic to be described later).

Thus the light beam of a wavelength of 946 nm is confined between the surfaces 13a and 14a and oscillates. The laser beam 18 thus produced impinges upon the $KNbO_3$ crystal 15 and is converted into its second harmonic 19 having a wavelength of 473 nm equal to a half of the wavelength of the laser beam 18. The second harmonic 19 is output from the resonator mirror 14.

The semiconductor laser 11 and the condenser lens 12 are fixed to a first holder 20, and the Nd:YAG crystal 13, the $KNbO_3$ crystal 15, the etalon 16 and the resonator mirror 14 are fixed to a second holder 21. The holders 20 and 21 are fixed to a base plate 22 which is fixedly mounted on a Peltier element 24 connected to a heat sink 23.

In this embodiment, the Nd:YAG crystal 13 and the resonator mirror 14 form a Fabry-Perot resonator, and the resonator, the semiconductor laser 11 and the condenser lens 12 are kept at a predetermined temperature by the Peltier element 24 driven by a temperature control circuit not shown.

The second holder 21 is, for instance, of copper and has a pair of mirror mounting portions 21a and 21b spaced from each other in the direction of the optical axis of the resonator and a part mounting portion 21c. The mirror mounting portions 21a and 21b and the part mounting portion 21c are connected together by way of a connecting portion 21d formed integrally therewith. The holder 21 is substantially E-shaped in cross-section.

The outer surfaces of the mirror mounting portions 21a and 21b are ground to mirror-finished mirror mounting surfaces 21e and 21f extending perpendicular to the optical axis of the resonator. Two surfaces of the part mounting portion 21c spaced from each other in the direction of the optical axis of the resonator are also ground to mirror-finished part mounting surfaces 21g and 21h extending perpendicular to the optical axis of the resonator. Each of the mounting portions 21a, 21b and 21c is provided with an opening for passing the laser beam 18 and the second harmonic 19.

The Nd:YAG crystal 13, which also functions as a resonator mirror, is fixed to the mirror mounting portion 21a by bonding a light transmissive end face to the mirror mounting surface 21e. The resonator mirror 14 is fixed to the mirror mounting portion 21b by bonding the mirror surface 14a to the mirror mounting surface 21f. The $KNbO_3$ crystal 15 and the etalon 16 are fixed to the part mounting portion 21c by bonding their one light transmissive end face respectively to the part mounting surfaces 21g and 21h. For example, two-part room temperature curing epoxy adhesive or room temperature vulcanizing silicone rubber adhesive may be used.

When the Nd:YAG crystal 13 and the resonator mirror 14 are fixed to the holder 21 in the manner described above, the number of the bonded parts which affects the length of the resonator is only two, that is, between the Nd:YAG crystal 13 and the mirror mounting surface 21e and between the resonator mirror 14 and the mirror mounting surface 21f. Accordingly change in the length of the resonator mainly depends upon the sum of the changes in the thickness of two adhesive layers at the two bonded parts due to change in the degree of cure or due to stress, whereby change in the length of the resonator can be suppressed to relatively small. The bonded parts of the $KNbO_3$ crystal 15 and the etalon 16 do not affect the length of the resonator.

In this particular embodiment, since the mirror mounting surfaces 21e and 21f are mirror-finished, the adhesive uniformly spreads wide and the adhesive layer can be smaller in thickness, whereby change in the resonator length can be smaller.

When the thickness of the adhesive layer at each of the bonded parts of the mirror mounting surfaces 21e and 21f is 1 to $2\mu$ and the adhesive is cured under an optimum condition, the change in the thickness of the adhesive layer can be not larger than 1%. When the laser-diode-pumped solid state laser having a structure described above was operated for 5,000 hours in a normal air-conditioned environment, the change in the length of the resonator was not larger than 0.02 $\mu$m.

Further in this embodiment, since the Nd:YAG crystal 13 and the resonator mirror 14 are bonded to the holder 21, they cannot be moved from the predetermined position after a long use or when subjected to vibration.

Figure 2:
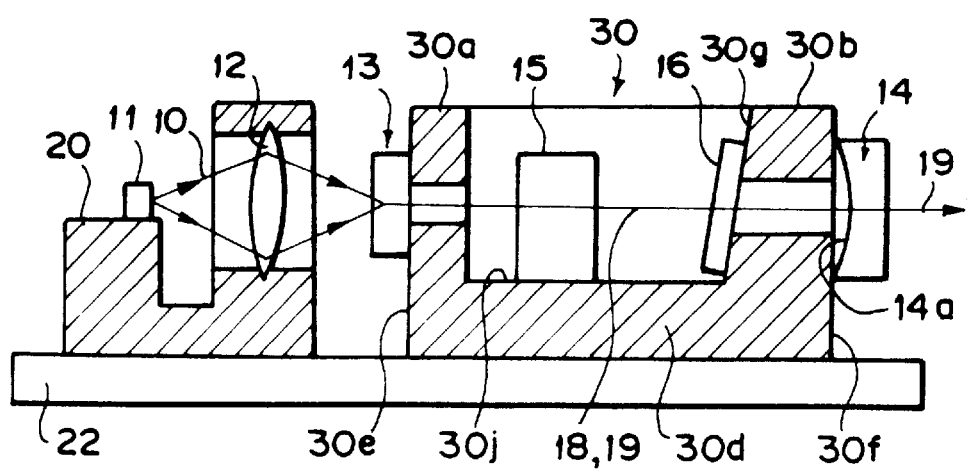
FIG. 2 is a schematic side view showing a laser-diode-pumped solid state laser in accordance with a second embodiment of the present invention.
Figure 3:
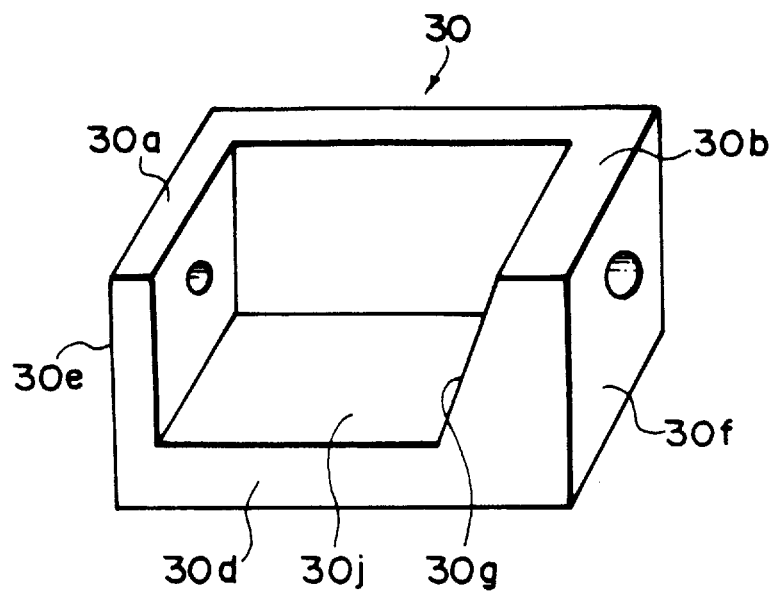
FIG. 3 is a perspective view showing the holder employed in the second embodiment.

A second embodiment of the present invention will be described with reference to FIGS. 2 and 3, hereinbelow. In FIGS. 2 and 3, the elements analogous to those in the first embodiment are given the same reference numerals and will not be described again.

In the second embodiment, a holder 30 shown in FIG. 3 is employed in place of the holder 21 employed in the first embodiment. The second holder 30 is, for instance, of copper and has a pair of mirror mounting portions 30a and 30b spaced from each other in the direction of the optical axis of the resonator. The mirror mounting portions 30a and 30b are connected together by way of a connecting portion 30d formed integrally therewith.

The outer surfaces of the mirror mounting portions 30a and 30b are ground to mirror-finished mirror mounting surfaces 30e and 30f extending perpendicular to the optical axis of the resonator. The inner surface of the mirror mounting portion 30b forms a part mounting surface 30g inclined with respect to the optical axis of the resonator. Each of the mounting portions 30a and 30b is provided with an opening for passing the laser beam 18 and the second harmonic 19.

The Nd:YAG crystal 13, which also functions as a resonator mirror, is fixed to the mirror mounting portion 30a by bonding a light transmissive end face to the mirror mounting surface 30e. The resonator mirror 14 is fixed to the mirror mounting portion 30b by bonding the mirror surface 14a to the mirror mounting surface 30f. The etalon 16 is fixed to the mirror mounting portion 30b by bonding one light transmissive end face to the part mounting surfaces 30g. The KNbO$_3$ crystal 15 is bonded to the inner bottom surface of the holder 30. These elements may be bonded by use of the same adhesive as employed in the first embodiment.

Also in the second embodiment, the number of the bonded parts which affects the length of the resonator is only two, that is, between the Nd:YAG crystal 13 and the mirror mounting surface 30e and between the resonator mirror 14 and the mirror mounting surface 30f. Accordingly change in the length of the resonator can be suppressed to relatively small.

Though not shown in FIG. 2, the base plate 22 is fixedly mounted on a Peltier element 24 shown in FIG. 1 and the resonator, the semiconductor laser 11 and the condenser lens 12 are kept at a predetermined temperature. This is the same in the following third and fourth embodiments.

Figure 4:
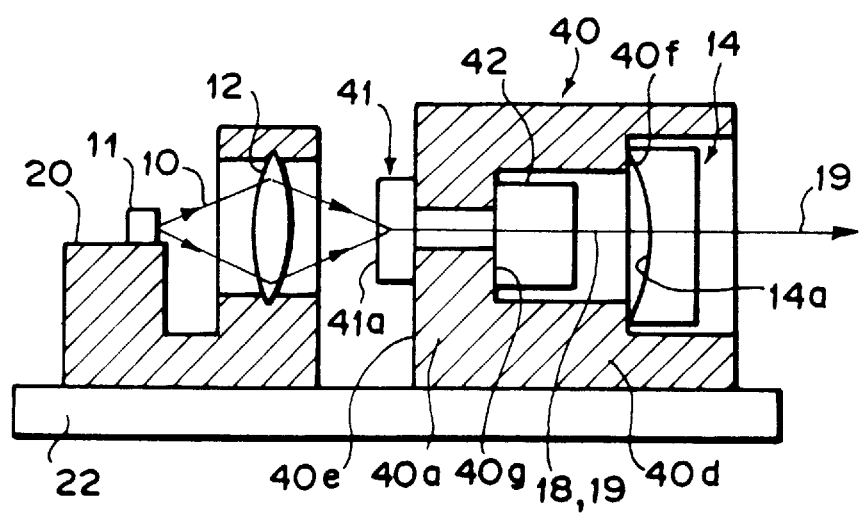
FIG. 4 is a schematic side view showing a laser-diode-pumped solid state laser in accordance with a third embodiment of the present invention.

A third embodiment of the present invention will be described with reference to FIG. 4, hereinbelow. In the third embodiment, a Nd:YVO$_4$ crystal 41 is employed in place of the Nd:YAG crystal 13 employed in the first embodiment, a KTP crystal 42 is employed in place of the KNbO$_3$ crystal 15 employed in the first embodiment, and a holder 40 is employed in place of the holder 21.

The semiconductor laser 11 produces a laser beam 10 having a wavelength of 809 nm. Neodymium ions in the Nd:YVO$_4$ crystal 41 are stimulated by the laser beam 10 and the Nd:YVO$_4$ crystal 41 thereby produces a laser beam having a wavelength of 1064 nm. The pumping light incident side end face 41a of the Nd:YVO$_4$ crystal 41 is provided with a coating which is highly reflecting (a reflectivity of not lower than 99.9%) at 1064 nm and antireflecting (a transmittance of not lower than 99%) at 809 nm (the wavelength of pumping leaser beam 10). The mirror surface 14a of the resonator mirror 14 is provided with a coating which is highly reflecting at 1064 nm and antireflecting at 532 nm (the wavelength of second harmonic to be described later).

Thus the light beam of a wavelength of 1064 nm is confined between the surfaces 41a and 14a and oscillates. The laser beam 18 thus produced impinges upon the KTP crystal 42 and is converted into its second harmonic 19 having a wavelength of 532 nm equal to a half of the wavelength of the laser beam 18. The second harmonic 19 is output from the resonator mirror 14.

The holder 41 is, for instance, of copper and is in the form of a cylinder having a bottom. The bottom portion forms a mirror mounting portion 40a and the cylinder portion forms a connecting portion 40d which doubles as a mirror mounting portion. The outer surface of the mirror mounting portion 40a is ground to a mirror-finished mirror mounting surface 40e extending perpendicular to the optical axis of the resonator. A shoulder portion is formed on the inner surface of the connecting portion 40d and the shoulder portion is ground to another mirror-finished mirror mounting surface 40f extending perpendicular to the optical axis of the resonator. The inner surface of the mirror mounting portion 40a is ground to a part mounting surface 40g extending perpendicular to the optical axis of the resonator. The mirror mounting portion 40a is provided with an opening for passing the laser beam 18 and the second harmonic 19.

The Nd:YVO$_4$ crystal 41, which also functions as a resonator mirror, is fixed to the mirror mounting portion 40a by bonding a light transmissive end face to the mirror mounting surface 40e. The resonator mirror 14 is fixed by bonding the mirror surface 14a to the mirror mounting surface 40f. The KTP crystal 42 is bonded to the part mounting surface 40g. These elements may be bonded by use of the same adhesive as employed in the first embodiment.

Also in the third embodiment, the number of the bonded parts which affects the length of the resonator is only two, that is, between the Nd:YVO$_4$ crystal 41 and the mirror mounting surface 40e and between the resonator mirror 14 and the mirror mounting surface 40f. Accordingly change in the length of the resonator can be suppressed to relatively small.

Figure 5:
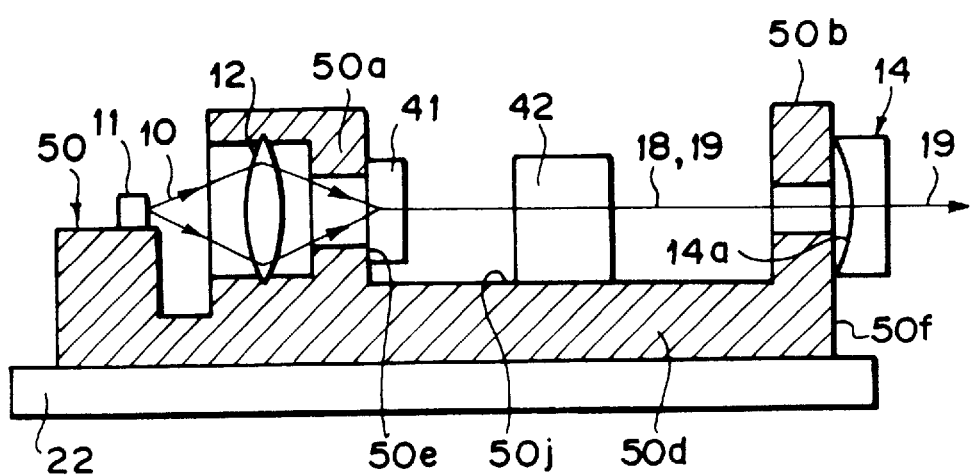
FIG. 5 is a schematic side view showing a laser-diode-pumped solid state laser in accordance with a fourth embodiment of the present invention.

A fourth embodiment of the present invention will be described with reference to FIG. 5, hereinbelow. In the fourth embodiment, a Nd:YVO$_4$ crystal 41 and a KTP crystal 42 are employed as in the third embodiment, and a holder 50 is employed.

The holder 50 has portions to which the semiconductor laser 11 and the condenser lens 12 are fixed, for instance, by bonding, as well as a pair of mirror mounting portions 50a and 50b spaced from each other in the direction of the optical axis of the resonator. The mirror mounting portions 50a and 50b are connected by a connecting portion 50d formed integrally therewith.

The right side surface of the mirror mounting portion 50a is ground to a mirror-finished mirror mounting surface 50e extending perpendicular to the optical axis of the resonator. The right side surface of the mirror mounting portion 50b is ground to a mirror-finished mirror mounting surface 50f extending perpendicular to the optical axis of the resonator. Each of the mirror mounting portions 50a and 50b are provided with an opening for passing the laser beam 18 and the second harmonic 19.

The Nd:YVO$_4$ crystal 41, which also functions as a resonator mirror, is fixed to the mirror mounting portion 50a by bonding a light transmissive end face to the mirror mounting surface 50e. The resonator mirror 14 is fixed to the mirror mounting portion 50b by bonding the mirror surface 14a to the mirror mounting surface 50f. The KTP crystal 42 is bonded to the inner bottom surface 50*j* of the holder 50. These elements may be bonded by use of the same adhesive as employed in the first embodiment.

Also in the fourth embodiment, the number of the bonded parts which affects the length of the resonator is only two, that is, between the Nd:YVO$_4$ crystal 41 and the mirror mounting surface 40*e* and between the resonator mirror 14 and the mirror mounting surface 40*f*. Accordingly change in the length of the resonator can be suppressed to relatively small.

Especially in the fourth embodiment, since all the laser components are mounted on one holder 50, a uniform temperature distribution can be obtained and accuracy in temperature control is improved. Though a similar advantage can be obtained also in the first to third embodiments where the resonator and the laser components to be disposed in the resonator are fixed to one holder, the advantage is especially excellent in the fourth embodiment.

What is claimed is:

1. A laser-diode-pumped solid state laser comprising a Fabry-Perot resonator having a pair of resonator mirrors comprising:

a single body holder having a pair of mirror mounting portions respectively having mirror mounting surfaces which are spaced from each other in the direction of the optical axis of the resonator and extend to intersect the optical axis of the resonator, and further having a connecting portion which is formed integrally with the mirror mounting portions to connect the mirror mounting portions, wherein each of the resonator mirrors is affixed to a respective mirror mounting portion by an adhesive provided between each resonator mirror's light transmissive surface and a mirror mounting surface of the respective mirror mounting portion, and wherein each resonator mirror's perimeter end is unconstrained by the respective mirror mounting portion such that the adhesive readjusts the position of the mirror without changing the length of the optical axis of the resonator during a temperature change.

2. A laser-diode-pumped solid state laser as defined in claim 1 in which the mirror mounting surfaces are mirror-finished.

3. A laser-diode-pumped solid state laser as defined in claim 1 in which said holder is provided with at least one part mounting portion which is integrally formed with the connecting portion spaced from the mirror mounting portions in the direction of the optical axis of the resonator and is provided with a part mounting surface extending to intersect the optical axis of the resonator, and a laser component other than the resonator mirrors is fixed to the part mounting surface.

4. A laser-diode-pumped solid state laser as defined in claim 3 in which said part mounting portion is provided between the mirror mounting portions and a component to be disposed in the resonator is fixed to the part mounting portion.

5. A laser-diode-pumped solid state laser as defined in claim 2 in which said holder is provided with at least one part mounting portion which is integrally formed with the connecting portion spaced from the mirror mounting portions in the direction of the optical axis of the resonator and is provided with a part mounting surface extending to intersect the optical axis of the resonator, and a laser component other than the resonator mirrors is fixed to the part mounting surface.

* * * * *